US010145959B2

(12) United States Patent
Raasakka et al.

(10) Patent No.: US 10,145,959 B2
(45) Date of Patent: Dec. 4, 2018

(54) WEIGHTING ALGORITHM FOR SIGNAL PROCESSING

(71) Applicant: Honeywell International Inc., Morris Plains, NJ (US)

(72) Inventors: Jussi Raasakka, Brno (CZ); Martin Orejas, Brno (CZ); Ondrej Kutik, Brno (CZ); Jakub Skalicky, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 304 days.

(21) Appl. No.: 15/076,424

(22) Filed: Mar. 21, 2016

(65) Prior Publication Data

US 2017/0269218 A1 Sep. 21, 2017

(51) Int. Cl.
  *G01S 19/21* (2010.01)
  *G01S 19/09* (2010.01)
  *G01S 19/36* (2010.01)
  *G01S 19/24* (2010.01)
  *G01S 19/37* (2010.01)

(52) U.S. Cl.
  CPC ............ *G01S 19/21* (2013.01); *G01S 19/246* (2013.01); *G01S 19/36* (2013.01); *G01S 19/37* (2013.01)

(58) Field of Classification Search
  CPC .................................. G01S 19/21; G01S 19/36
  USPC ................. 342/357.46, 357.59, 357.76, 382; 701/468, 478.5
  See application file for complete search history.

(56) References Cited

U.S. PATENT DOCUMENTS

| 5,270,723 | A | * | 12/1993 | Lopez | ............... | H01Q 3/267 343/703 |
|---|---|---|---|---|---|---|
| 5,952,968 | A | | 9/1999 | McDowell | | |
| 5,990,831 | A | | 11/1999 | McDowell | | |
| 7,250,903 | B1 | | 7/2007 | McDowell | | |
| 7,471,744 | B2 | | 12/2008 | Van Wechel et al. | | |
| 8,301,677 | B2 | | 10/2012 | Grobert | | |
| 2008/0143594 | A1 | | 6/2008 | Wang et al. | | |
| 2012/0155582 | A1 | | 6/2012 | Le Liboux et al. | | |

(Continued)

FOREIGN PATENT DOCUMENTS

| CN | 101900819 | 12/2010 |
|---|---|---|
| CN | 104345321 | 2/2015 |

(Continued)

OTHER PUBLICATIONS

Chang et al., "Effect of Array Configurations on the Performace of GNSS Interference Suppression", "International Journal of Control, Automation, and Systems", Published Dec. 2008, pp. 884-893, vol. 6, No. 6.

(Continued)

*Primary Examiner* — Dao L Phan
(74) *Attorney, Agent, or Firm* — Fogg & Powers LLC

(57) ABSTRACT

A global navigation satellite system (GNSS) receiver includes: at least one radio frequency (RF) front end configured to receive a GNSS signal from a single GNSS antenna and to digitize the GNSS signal into a digitized GNSS signal; at least one processor configured to: calculate weight to be applied to a sample of a block of samples of the digitized GNSS signal; apply the weight to at least one sample of the block of samples of the digitized GNSS signal to create a weighted GNSS signal; and perform signal processing on the weighted GNSS signal.

20 Claims, 6 Drawing Sheets

(56) References Cited

U.S. PATENT DOCUMENTS

2012/0326926 A1* 12/2012 Vander Velde ....... G01S 19/243
                                                                  342/357.68
2013/0154880 A1  6/2013 Dickman et al.
2014/0177682 A1  6/2014 Yu
2014/0247186 A1  9/2014 Daneshmand et al.

FOREIGN PATENT DOCUMENTS

WO      9957573     11/1999
WO      2015014976   2/2015

OTHER PUBLICATIONS

Hongwei et al., "Adaptive Beamforming Algorithm for Interference Suppression in GNSS Receivers", "International Journal of Computer Science & Information Technology (IJCSIT)", Published Oct. 2011, pp. 17-28, vol. 3, No. 5.
Hongwei et al., "Interference Suppression in GNSS Receiver Using Space-Time Adaptive Processing", "Communication Software and Networks (ICCSN), 2011 IEEE 3rd International Conference", Published Jun. 2011, pp. 381-385, Publisher: IEEE, Published in: US.
European Patent Office, "Extended European Search Report from EP Application No. 17155089.0, dated Aug. 9, 2017", "from Foreign Counterpart of U.S. Appl. No. 15/076,424", dated Aug. 9, 2017, pp. 1-9, Published in: EP.
Zisserman, "Lectures 3 & 4: Estimators" Feb. 2007, Available: http://www.robots.ox.ac.uk/~az/lectures/est/lect34.pdf; pp. 1-35; Published: US.

* cited by examiner

WEIGHTING ALGORITHM FOR SIGNAL PROCESSING

BACKGROUND

Global navigation satellite system (GNSS) receiver acquisition and tracking functions can often be vulnerable due to the extreme low Signal-to-Noise Ratio (SNR) on which the satellite signals are received. Corruption in GNSS signals can occur due to many reasons, such as shadowing or intentional or unintentional interference that can make the GNSS signals unusable.

SUMMARY

A global navigation satellite system (GNSS) receiver includes: at least one radio frequency (RF) front end configured to receive a GNSS signal from a single GNSS antenna and to digitize the GNSS signal into a digitized GNSS signal; at least one processor configured to: calculate weight to be applied to a sample of a block of samples of the digitized GNSS signal; apply the weight to at least one sample of the block of samples of the digitized GNSS signal to create a weighted GNSS signal; and perform signal processing on the weighted GNSS signal.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
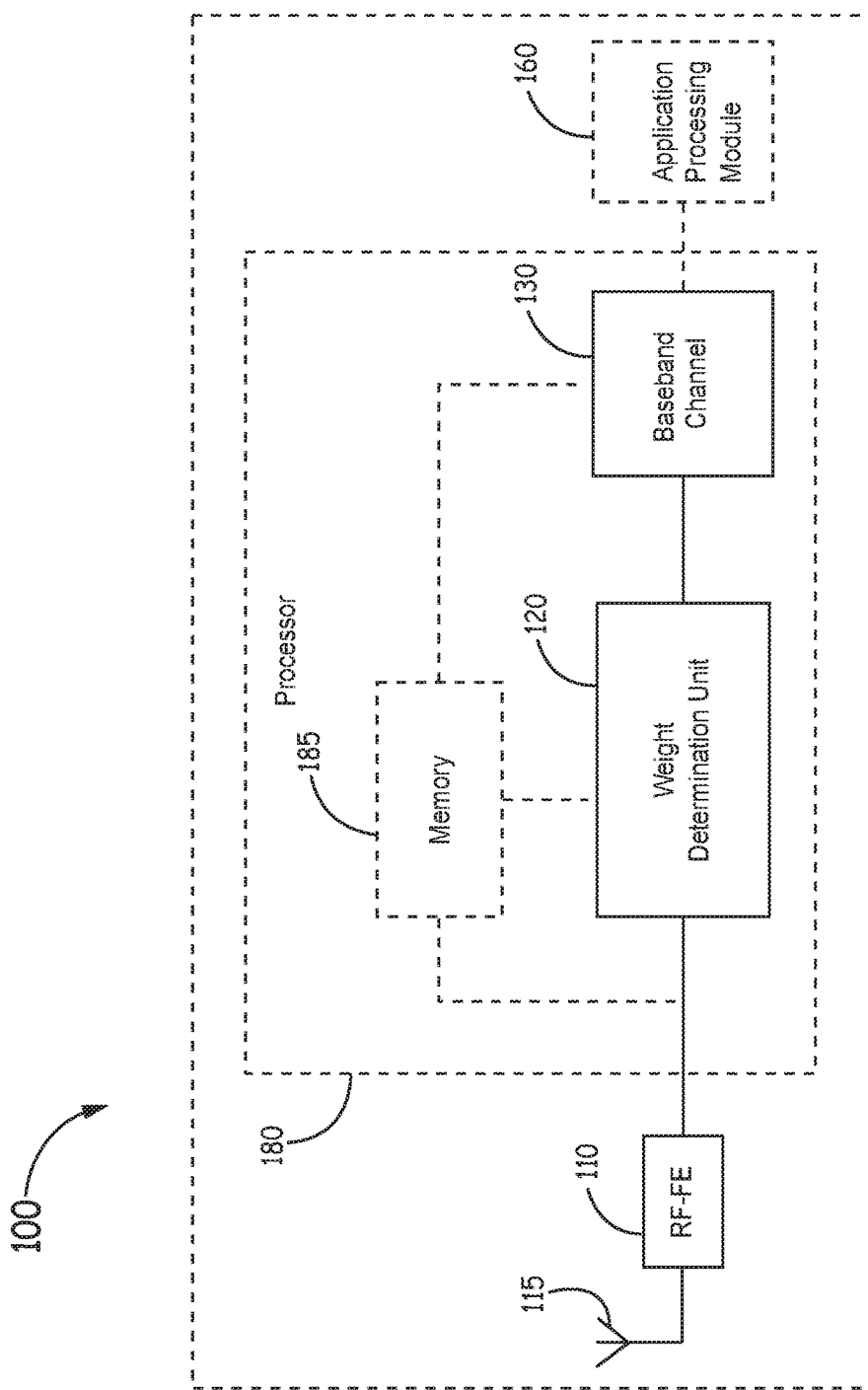
FIG. 1A shows an example of a global navigation satellite system (GNSS) receiver as implemented in embodiments described herein.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

GNSS receiver acquisition and tracking functions can often be erroneous due to the extreme low Signal-to-Noise Ratio (SNR) on which the satellite signals are received. The loss of GNSS signals can occur due to many reasons. The satellite signal can be attenuated due to shadowing or an intentional or unintentional interference can make the GNSS signals unusable. In example embodiments, GNSS is implemented using a Global Positioning System (GPS), but it is understood that the system is not limited to GPS signals. In other implementations, other types of Global Navigation Satellite Systems (GNSS), such as GLONASS, Galileo, Beidou and Compass navigation systems, and combinations thereof, may in time be used instead of GPS to obtain position. GNSS receivers can be used in various applications including navigation in automobiles, aircrafts, spacecraft, etc. and for purposes of surveying and mapping in industries such as construction, geology and archeology.

Interference in the received GNSS signals can be caused by Distance Measurement Equipment (DME). DME sends high powered pulses between aircraft and a ground station, which the aircraft can use to determine its distance to the ground transponder. These pulses can have a very harmful effect on GNSS receiver operation. Conventionally, the impact of DME interference is mitigated by blanking the pulses which are contaminated by the DME interference, by effectively zeroing out the samples going to the GNSS baseband processing. However, GNSS signal information contained in those samples can be lost when zeroing out the samples and result in significant degradation of the GNSS receiver performance.

The GNSS signal received may be changed due to some conditions like shadowing or interference. In such a case, multiple different Gaussian measurements of the GNSS signal can arise. For example, multiple different Gaussian measurements may arise when an aircraft is performing a banking maneuver, and the power of the received GNSS signal fluctuates due to shadowing caused by the aircraft's body. In another example, pulsed interference signals such as the DME can be present, which create short pulses (such as 3.5 µs) that may deteriorate the GNSS receiver performance. In exemplary embodiments, two different Gaussian measurements of the GNSS signal may arise.

In yet another example, non-stationary interference may be present in a signal generated by GNSS jammers that mask the satellite signals by more powerful interference signals. These signals occupy a large bandwidth by utilizing a chirp signal, which is essentially a continuous wave signal whose frequency is constantly changing. Typically, the GNSS jammers cover more bandwidth than a typical GNSS receiver Radio Frequency Front-End (RF-FE). When the jammer signal is outside of the GNSS RF-FE bandwidth, it is attenuated by the filtering stages of the GNSS RF-FE causing short duration "pulses" when the interference is in-band of the GNSS RF-FE. For the reasons stated above and for other reasons stated below, it will become apparent to those skilled in the art upon reading and understanding the specification, there is a need in the art for improved systems and methods for signal processing that accounts for changes in the received GNSS signals while still retaining GNSS signal information.

The embodiments described within the present disclosure provide systems and methods for applying weights to samples of the incoming digital signal. In the embodiments described herein, when the signal has periods where the input has changed due to some conditions, the measurements are given appropriate weights based on their optimal values by applying a weighting algorithm on the received GNSS signal before processing the signal.

In exemplary embodiments, a weighting algorithm outputs a combination of two independent Gaussian measurements with different variances. For example, a first measurement of the signal may have a small error whereas a second measurement may have a large error. In such an example, both measurements of the signal are combined such that more weight is applied to the first measurement having a small error as compared to the weight applied to the second measurement with larger error.

An exemplary equation combining two measurements with different variances is shown as follows:

$$x_{MLE} = \frac{\frac{1}{\sigma_1^2}z_1 + \frac{1}{\sigma_2^2}z_2}{\frac{1}{\sigma_1^2} + \frac{1}{\sigma_2^2}} \qquad \text{Eq. (1)}$$

In Eq. (1), $x_{MLE}$ is the maximum likelihood estimator of x, $z_1$ is the first measurement of x with variance $\sigma_1^2$, and $z_2$ is the second measurement of x with variance $\sigma_2^2$. As shown in Eq. (1), the inverse of variances $\sigma_1^2$ and $\sigma_2^2$ is multiplied by their respective measurements $z_1$ and $z_2$, and further divided by the sum of the inverses. In this example, the weighting algorithm applies weights to the measurements based on the variances of the two different Gaussian measurements.

FIG. 1A shows an example of a global navigation satellite system (GNSS) receiver 100 as implemented in embodiments described herein. GNSS receiver 100 includes at least one radio frequency front end (RF-FE) 110 and at least one processor 180. GNSS receiver includes or is coupled to at least one antenna 115 that receives the GNSS signal, at least one radio frequency front end (RF-FE) 110 and at least one weight determination unit 120 coupled to the RF-FE 110. GNSS receiver 100 further includes at least one processor 180 that processes the digitized samples output by RF-FE 110. At least one GNSS signal is received by the GNSS receiver 100 through antenna 115 and fed into RF-FE 110. The at least one GNSS signal received by the GNSS receiver 100 may include noise and/or interference in the signal. In exemplary embodiments, RF-FE 110 down-converts and digitizes the received GNSS signal into digitized samples. The digitized samples of the received GNSS signal are then received by the at least one processor 180.

In exemplary embodiments, the at least one processor 180 includes at least one memory 185. In exemplary embodiments, the at least one processor 180 implements at least one weight determination unit 120. Weight determination unit 120 applies weighting to the received digitized samples before they are fed for further processing. In exemplary embodiments, the at least one processor 180 also implements at least one baseband channel 130. Baseband channel 130 receives the weighted samples from weight determination unit 120 and processes the samples including the weighting. In exemplary embodiments, the at least one processor 180 includes a plurality of processing units, each processing unit configured to implement at least one of a weight determination unit 120 or a baseband channel 130.

In exemplary embodiments, the at least one memory 185 is communicatively coupled to RF-FE 110 and stores the digitized samples while the weighting is being applied by the weight determination unit 120. In exemplary embodiments, stored samples from memory 185 may be fed into the baseband channel 130 for further processing. In exemplary embodiments, memory 185 is also coupled with a weight determination unit 120, and the weighted samples are fed into memory 185 and baseband channel 130. In exemplary embodiments, processor 180 is a field programmable gate array (FPGA). In exemplary embodiments, processor 180 is an application specific integrated circuit (ASIC). In exemplary embodiments, processor 180 is a general purpose processor (GPP). In exemplary embodiments, processor 180 is a digital signal processor (DSP).

After processing the signal, baseband channel 130 outputs a signal containing information (such as signal power, frequency, delay, etc.) for use in various applications. In exemplary embodiments, the signal output by baseband channel 130 goes to other applications within the GNSS receiver. As shown in FIG. 1A, in exemplary embodiments, GNSS receiver 110 includes at least one application processing module 160. For example, in a baseband channel 130 functioning as an acquisition unit, the signal output by baseband channel 130 may be fed into a control software to determine whether the signal is detected, and may be sent into a tracking channel for further processing. In exemplary embodiments, the control software may be executed by applications processing module 160. In exemplary embodiments, when baseband channel 130 is a tracking channel, the signal output by baseband channel 130 may be pseudoranges generated to produce position, velocity and time solution.

In exemplary embodiments, application processing module 160 is included in processor 180. In exemplary embodiments, application processing module 160 may be included in another processor. In exemplary embodiments, application processing module 160 may be implemented in at least one of an ASIC, a FPGA, a GPP and DSP. In exemplary embodiments, application processing module 160 outputs position, velocity and time (PVT) information of the receiver. In exemplary embodiments, the application processing module output may be sent to another system for additional processing. In exemplary embodiments, this application processing module output is displayed on a display to provide access to a user.

In exemplary embodiments, the at least one processor 180 implements at least some of the processing described herein. In exemplary embodiments, the at least one processor 180 includes at least one programmable processor, such as a microprocessor, a microcontroller, an application-specific integrated circuit (ASIC), a field-programmable gate array (FPGA), a field-programmable object array (FPOA), or a programmable logic device (PLD). The at least one processor 180 described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Weight determination unit 120 includes a weighting algorithm to determine the weight to be applied to each of the received samples. The output of the weight determination unit 120 includes the digitized samples having the noise and interference with the appropriate weights applied using the weighting algorithm. In exemplary embodiments, an average of the received samples is calculated to calculate a particular weight to be assigned to the received sample before it is fed to baseband channel 130.

The baseband channel 130 is coupled to the weight determination unit 120. The output from weight determination unit 120, the weighted samples are received by baseband channel 130 to be processed. In exemplary embodiments, baseband channel 130 may be a baseband tracking channel. In exemplary embodiments, baseband channel 130 may be a signal acquisition unit.

Figure 1B:
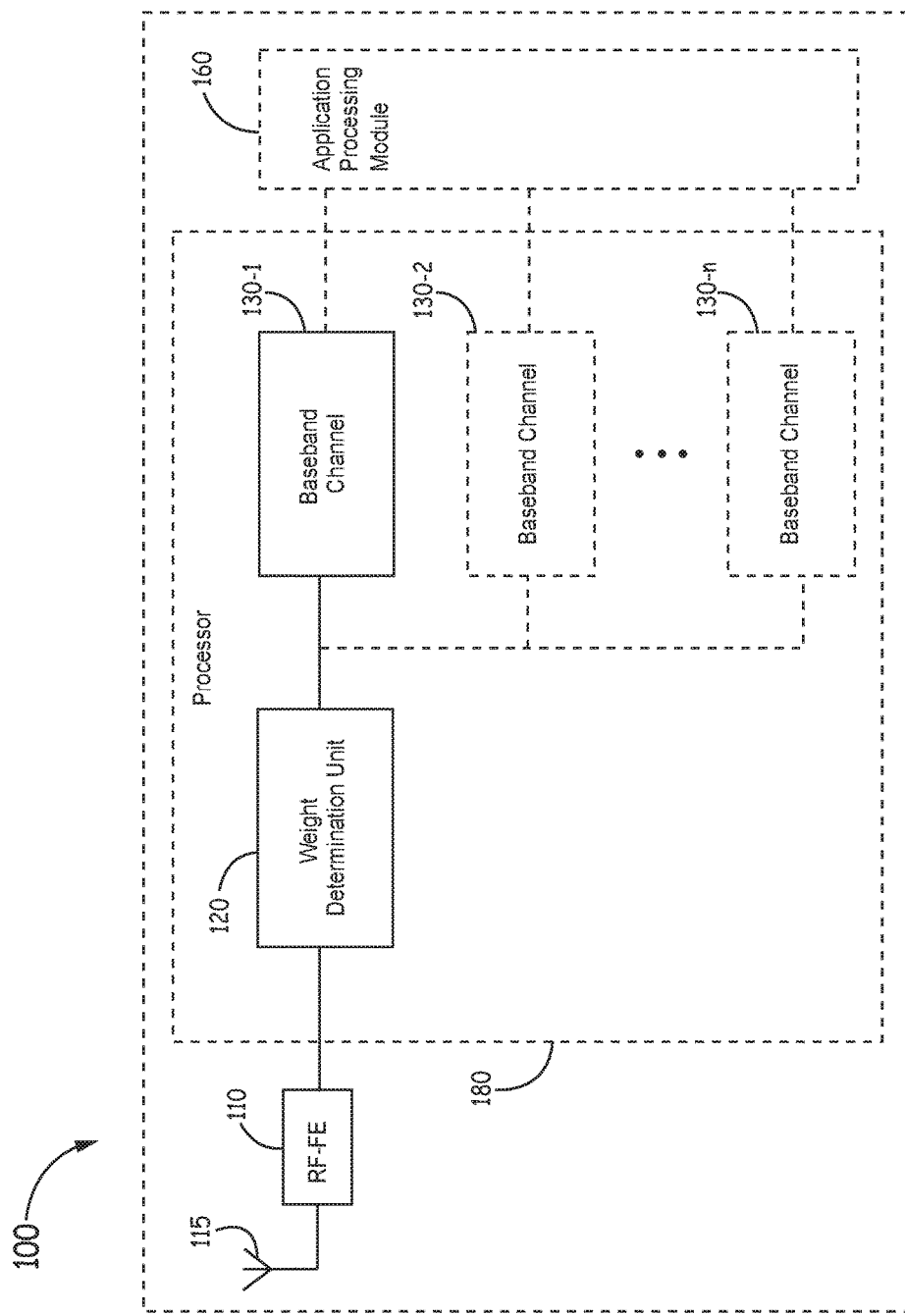
FIG. 1B shows an example of a GNSS receiver as implemented in embodiments described herein.

FIG. 1B shows another example of a GNSS receiver 100 as implemented in embodiments described herein. GNSS receiver 100 includes a RF-FE 110 coupled to a weight determination unit 120. As shown in FIG. 1B, in exemplary embodiments, weight determination unit 120 can be coupled to one or more baseband channel(s) 130-1, 130-2, ... 130-n. In the example as the one shown in FIG. 1B, a single weight determination unit 120 is coupled to one or more baseband channel(s) 130-1, 130-2, ... 130-n. Thus, the same weighting algorithm is applied to all baseband channel(s) 130-1, 130-2, ... 130-n coupled to the weight determination unit 120.

Often, different types of noise and/or interferences may require different weighting algorithms that need to be applied before the samples are sent to be processed in baseband channel 130. For example, a DME interference may need to be addressed with a weighting algorithm different from the weighting algorithm applied on a chirp interference in a signal. In exemplary embodiments, where the signal has a DME interference, the shape of the interference is known and can be used as a factor by the weighting algorithm to determine the appropriate weight to be applied for a particular sample. In exemplary embodiments, when the signal has a chirp interference, the shape of the interference is not always known, thus the algorithm used to determine appropriate weight for a signal having a DME interference may not be effective in a signal having a chirp interference.

As shown in FIG. 1B, output from baseband channel(s) 130-1, 130-2, ... 130-n, may be sent to at least one application processing module 160. In exemplary embodiments, all of the outputs from baseband channel(s) 130-1, 130-2, ... 130-n are received by a single application processing module 160. In exemplary embodiments, GNSS receiver 100, may include multiple application processing module(s) and each of the output from baseband channel(s) 130-1, 130-2, ... 130-n is sent to a respective application processing module for further processing.

Figure 1C:
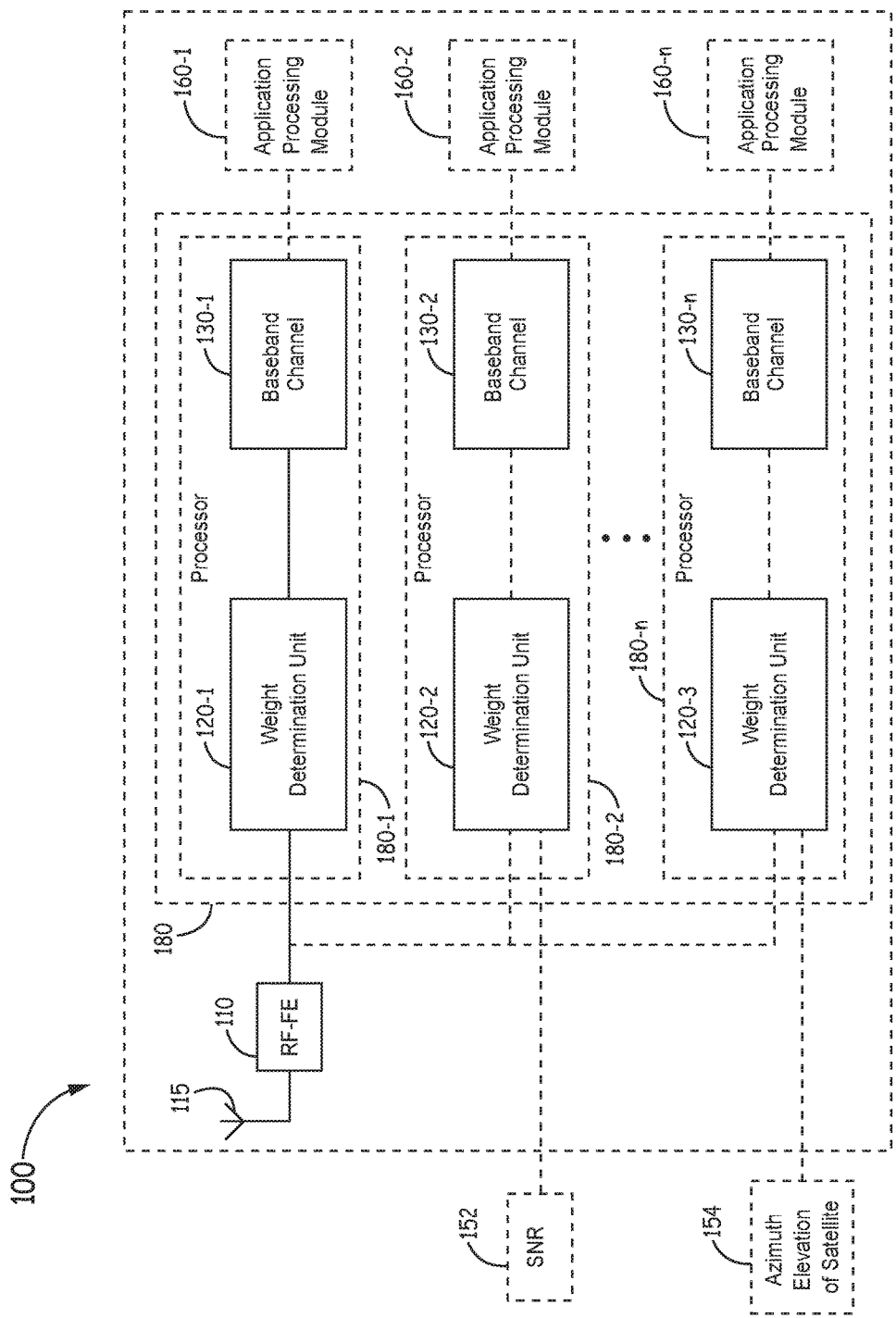
FIG. 1C shows an example of a GNSS receiver as implemented in embodiments described herein where a weighting algorithm is applied for different signals.

FIG. 1C shows an example of a GNSS system 100 as implemented in embodiments described herein where a weighting algorithm is applied for different signals based on additional inputs. GNSS system 100 includes a RF-FE 110 coupled to at least one weight determination unit 120-1.

Further, weights applied to the GNSS signal may be dependent on additional inputs received by the weight determination unit 120. The example shown in FIG. 1C allows for more precise weights to be given for each tracked satellite since the weights can be dependent on one or more additional inputs received by the weight determination unit 120 other than RF-FE 110. These inputs may be signal to noise ratio (SNR) of the satellite, the azimuth elevation of the satellite, orientation information of an aircraft (such as pitch, roll, yaw, etc.) or other similar parameters. For example, as shown in FIG. 1C, weight determination unit 120-1 applies the weight for a first satellite based on the signal received from the RF-FE 110, weight determination unit 120-2 may receive the signal from RF-FE 110 and an SNR input 152 of a second satellite that is used in determination of the weight to be applied for the block of samples of the GNSS signal received for the second satellite, and weight determination unit 120-n may receive an azimuth elevation 154 of a third satellite along with the signal from RF-FE 110. Each weight determination unit is coupled to a respective baseband channel (weight determination unit 120-1 to baseband channel 130-1, weight determination unit 120-2 to baseband channel 130-2, ... weight determination unit 120-n to baseband channel 130-n). In exemplary embodiments, all of the weight determination units and baseband channels are included in a single processor 180. In exemplary embodiments, RF-FE 110 is coupled to a plurality of processors 180-1, 180-2, 180-n, wherein each of the processors comprises a respective weight determination unit coupled to a respective baseband channel (processor 180-1 includes weight determination unit 120-1 and baseband channel 130-1, processor 180-2 includes weight determination unit 120-2 and baseband channel 130-2, processor 180-n includes weight determination unit 120-n and baseband channel 130-n). Thus, the weights applied to each individual satellite can be tuned based on the inputs received. In exemplary embodiments, each processor 180 is a FPGA or an ASIC. In exemplary embodiments, processor(s) 180-1, 180-2, ... 180-n is at least one of a FPGA, ASIC, GPP or a DSP.

As shown in FIG. 1C, output from each of the baseband channel(s) 130-1, 130-2, ... 130-n may be sent to a respective application processing module 160-1, 160-2, ... 160-n. In exemplary embodiments, one or more of the application processing modules 160-1, 160-2, ... 160-n are included in a respective processor 180-1, 180-2, ... 180-n. In exemplary embodiments, all of the outputs from baseband channel(s) 130-1, 130-2, ... 130-n are received by a single application processing module 160.

Figure 2:
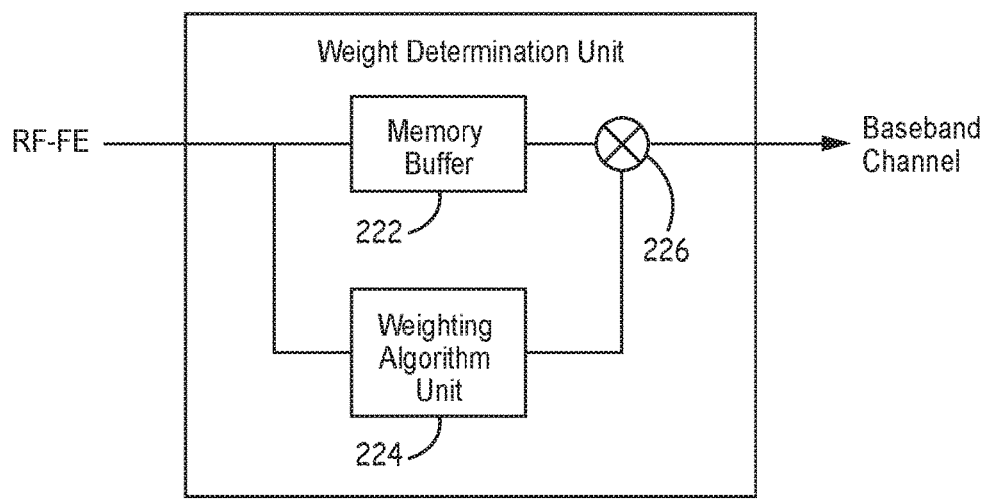
FIG. 2 shows an example of a weight determination unit that can be included in any of the examples of a GNSS receiver shown in FIGS. 1A-1C according to at least one embodiment described in the present disclosure.

FIG. 2 shows an example of a weight determination unit 220 that can be included in GNSS receiver 100. The weight determination unit 220 can be included as weight determination unit 120 in any of the examples shown in FIGS. 1A-1C and 3. As shown in FIG. 2, a weight determination unit 220 receives samples of digitized GNSS signal from RF-FE 110. Weight determination unit 220 includes at least one memory buffer 222, at least one weighting algorithm 224 and a multiplier 226. In exemplary embodiments, the samples of GNSS signal received from the RF-FE 210 are sent to the at least one memory buffer 222 and to the at least one weighting algorithm 224. Memory buffer 222 stores the received samples. Weighting algorithm 224 calculates appropriate weights for the block of samples that are being buffered in the memory buffer 222. In exemplary embodiments, the memory buffer 222 stores the received samples for a given time delay during which the weighting algorithm 224 determines the optimum weight for each sample. The buffered sample output from memory buffer 222 is multiplied with its corresponding weight determined by weighting algorithm 224, and fed to a baseband channel (such as any baseband channel 130 as described herein and shown in FIGS. 1A-1C and 3) for further processing.

In exemplary embodiments, weighting algorithm 224 is configured to determine the type of interference affecting the GNSS signal. Weighting algorithm 224 considers the type of interference (such as DME, chirp interference, continuous wave interference, etc.) and based on the factors affecting the particular type of interference, weighting algorithm 224 determines the algorithm (such as signal to noise ratio, estimated interference power, etc.) that is to be used for calculation of the appropriate weights. In exemplary embodiments, when the type of interference is a DME pulse, weighting algorithm 224 locates the DME pulse using a correlation between the expected DME pulse shape and an incoming signal. After locating the DME pulse, the weighting algorithm 224 determines the power of the pulse based on sample amplitudes and calculates a weight optimal for a DME pulse having the determined power value. In exemplary embodiments, when the type of interference is a chirp interference, weighting algorithm 224 determines the power of the chirp to calculate the weight to be applied.

Figure 3:
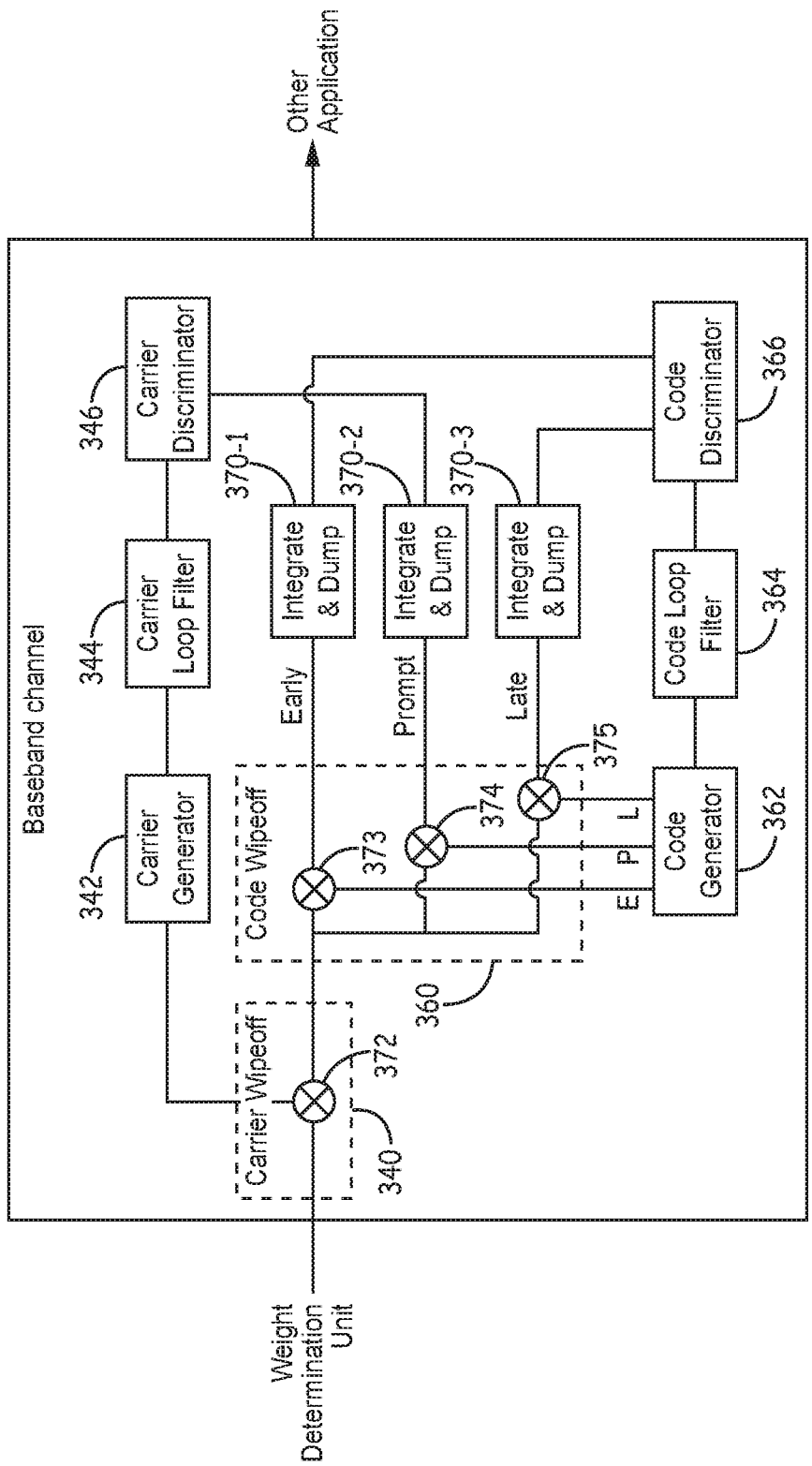
FIG. 3 shows an example of a baseband channel included in any of the examples of a GNSS receiver shown in FIGS. 1A-1C and 2 according to at least one embodiment described in the present disclosure.

FIG. 3 shows an example of a baseband channel 330 that can be included in a GNSS receiver 100. The baseband channel 330 can be included as baseband channel 130 in any of the examples shown in FIGS. 1A-1C and 2. As shown in FIG. 3, weighted samples of GNSS signal is sent to be processed by baseband channel 330.

In the example shown in FIG. 3, baseband channel 330 is a baseband tracking channel. The baseband tracking channel 330 has a carrier tracking loop and a code tracking loop. As shown in FIG. 3, baseband channel 330 comprises at least one carrier wipe off 340, at least one carrier generator 342, at least one carrier loop filter 344, and at least one carrier discriminator 346. Baseband channel 330 further comprises at least one code wipe off 360, at least one code generator 362, at least one code loop filter 364, and at least one code discriminator 366. In the example shown in FIG. 3, baseband channel 330 includes early integrate and dump 370-1, prompt integrate and dump 370-2, and late integrate and dump 370-3.

As shown in FIG. 3, the weighted signal GNSS output by weight determination unit 320 and the signal generated by carrier generator 342 are multiplied by multiplier 372 so that the signal is in baseband. The output from multiplier 372 is then fed into code wipeoff 360 that includes at least three multipliers 373, 374 and 375. A signal generated by code generator 362 is multiplied with the output from multiplier 372 using multipliers 373, 374 and 375 so that the weighted GNSS signal can be correlated with three replicas of the code by correlation spacing to provide early, prompt and late correlation result respectively. The output from multipliers 373, 374 and 375 are fed into early integrate and dump 370-1, prompt integrated and dump 370-2 and late integrate and dump 370-3.

As further shown in FIG. 3, outputs from early integrate and dump 370-1 and late integrate and dump 370-3 are received by the code discriminator 366, which is then sent to code loop filter 364 before being received by code generator 362. Accordingly, early and late correlation coefficients are only used for code tracking loop. In contrast, the prompt correlation result output by prompt integrate and dump 370-3 is also processed by carrier tracking loop. As shown in FIG. 3, the output from prompt integrate and dump 370-3 is sent to carrier discriminator 346, which is then sent to carrier loop filter 344 before being received by carrier generator 342.

Figure 4:
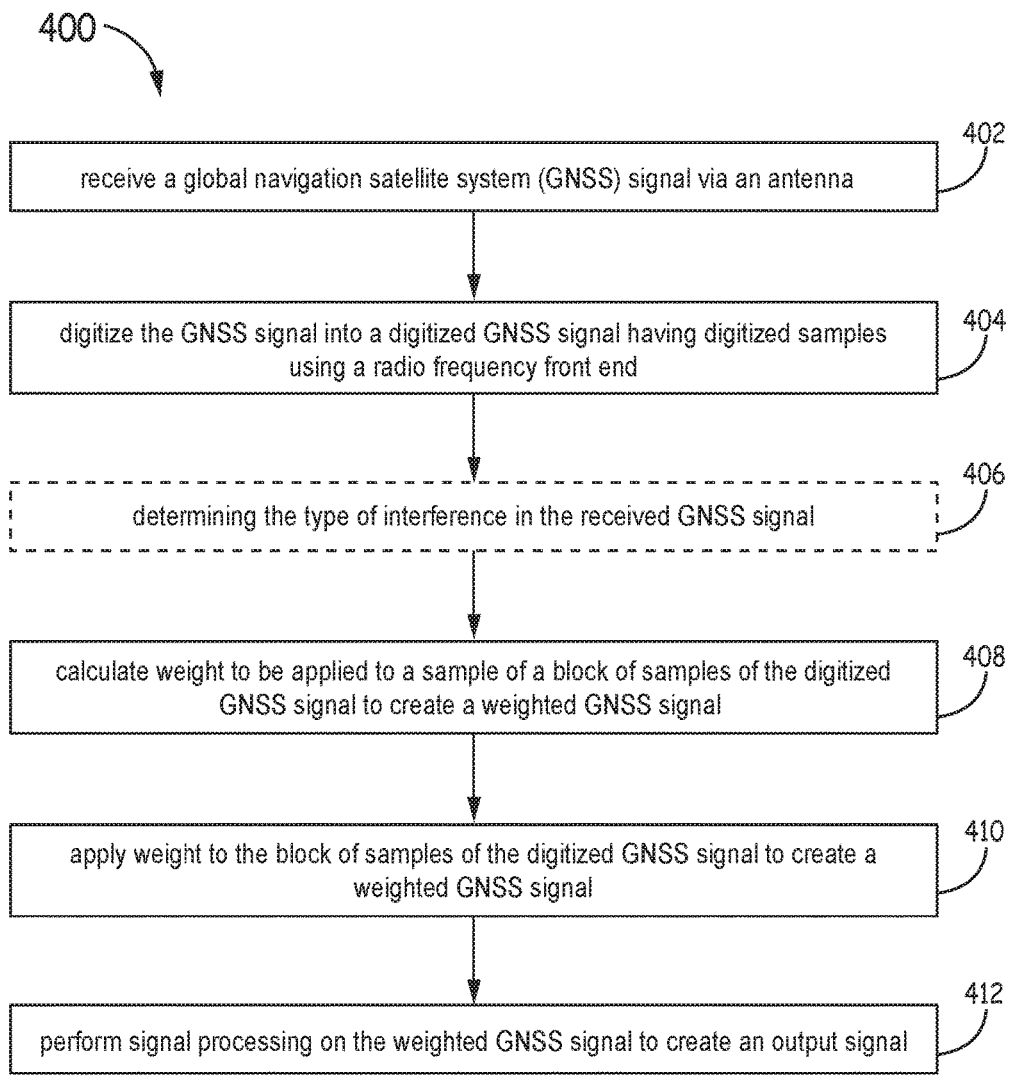
FIG. 4 illustrates an exemplary method of signal processing while accounting for interference in a signal according to at least one embodiment described in the present disclosure.

FIG. 4 is a flow diagram showing an exemplary method 400 of signal processing. Specifically, exemplary method 400 accounts for noise and/or interference in a received global navigation satellite system (GNSS) signal. As discussed herein, the method 400 is described with respect to examples of a GNSS receiver shown in FIGS. 1A-1C and 2-3. Method 400 can be performed using any of the GNSS receivers described in examples of FIGS. 1A-1C and 2-3. However, method 400 may apply to other examples of a GNSS receiver as well.

Method 400 begins at block 402 with receiving at least one global navigation satellite system (GNSS) signal via an antenna. Method 400 proceeds to block 404 with digitizing the at least one GNSS signal received using a radio frequency front end (RF-FE) into a digitized GNSS signal. In exemplary embodiments, method 400 further proceeds to an optional block 406 with determining the type of interference in the received GNSS signal.

Method 400 proceeds to block 408 with calculating weight to be applied to a sample of a block of samples of the digitized GNSS signal. In exemplary embodiments, calculating weight to be applied includes storing the digitized samples of the at least one GNSS signal in a memory buffer and calculating weight for a respective digitized sample in the weight determination unit.

Method 400 proceeds to block 410 with applying weight to at least one sample of the block of samples of the digitized GNSS signal to create a weighted GNSS signal. In exemplary embodiments, applying weight to at least one sample of the block of samples of the digitized GNSS signal includes multiplying the stored sample output from the memory buffer with the corresponding weighting calculated by a weighting algorithm.

In exemplary embodiments, applying weighting to digitized samples further comprises using a single weighting algorithm for all tracked satellites. In exemplary embodiments, applying weighting to digitized samples further comprises receiving additional satellite input, wherein applying weight to digitized samples further comprises using the additional input for calculating the weight to be applied to a sample of the block of samples. The additional satellite input may be a signal to noise ratio (SNR) of the satellite, estimated azimuth of the satellite or other parameters providing information about the satellite. In exemplary embodiments, applying weighting to digitized samples further comprises using a different weighting algorithm for a plurality of satellites. In exemplary embodiments, the weighting algorithm for a first of the plurality of satellites is different than the weighting algorithm for a second of the plurality of satellites.

Method 400 proceeds to block 412 with performing signal processing on the weighted GNSS signal to create an output signal. In exemplary embodiments of method 400, processing the weighted digitized samples further comprises acquisition of the GNSS signal by using weighted digitized samples. In exemplary embodiments, processing the weighted digitized samples further comprises tracking the GNSS signal by using weighted digitized samples. In exemplary embodiments, at least one of calculating weight, applying weight, and performing signal processing is performed using at least one of a microprocessor, a microcontroller, an application-specific integrated circuit (ASIC), a field-programmable gate array (FPGA), a field-programmable object array (FPOA), or a programmable logic device (PLD).

Example Embodiments

Example 1 includes a global navigation satellite system (GNSS) receiver comprising: at least one radio frequency (RF) front end configured to receive a GNSS signal from a single GNSS antenna and to digitize the GNSS signal into a digitized GNSS signal; at least one processor configured to: calculate weight to be applied to a sample of a block of samples of the digitized GNSS signal; apply the weight to at least one sample of the block of samples of the digitized GNSS signal to create a weighted GNSS signal; and perform signal processing on the weighted GNSS signal.

Example 2 includes the GNSS receiver of any of Examples 1-2 wherein the at least one processor is further configured to: store the block of samples in at least one memory buffer included in the at least one processor while the weight to be applied is calculated; to multiply buffered samples output by the at least one memory buffer with a corresponding weight calculated by at least one multiplier included in the at least one processor; and wherein the signal processing is performed on the output from the at least one multiplier.

Example 3 includes the GNSS receiver of Example 1, wherein the at least one processor is configured to implement a plurality of baseband channels configured to perform signal processing on the weighted GNSS signal, wherein each of the baseband channels receives at least a portion of the weighted GNSS signal to be processed.

Example 4 includes the GNSS receiver of any of Examples 1-3, wherein the at least one processor further implements: at least one weight determination unit by being configured to: receive a GNSS signal from the at least one RF front end; receive additional satellite input; calculate weight to be applied to a sample of a block of samples of the digitized GNSS signal based on the received additional satellite input; and apply the weight to at least one sample of the block of samples of the digitized GNSS signal to create a weighted GNSS signal; and at least one baseband channel by being configured to: perform signal processing on the weighted GNSS signal.

Example 5 includes the GNSS receiver of any of Examples 1-4, wherein the at least one processor includes at least one of a microprocessor, a microcontroller, an application-specific integrated circuit (ASIC), a field-programmable gate array (FPGA), a field-programmable object array (FPOA), or a programmable logic device (PLD).

Example 6 includes the GNSS receiver of any of Examples 1-5, wherein the at least one processor is configured to implement at least one baseband channel, wherein the at least one baseband channel includes at least one of a GNSS baseband tracking channel and a GNSS acquisition unit.

Example 7 includes the GNSS receiver of any of Examples 1-6, wherein the at least one processor is configured to implement at least one baseband channel, wherein the at least one baseband channel further comprises: at least one carrier generator; at least one carrier loop filter; at least one carrier discriminator; at least one code generator; at least one code loop filter; and at least one code discriminator.

Example 8 includes the GNSS receiver of any of Examples 1-7, wherein the at least one processor is configured to calculate the weight to be applied to a sample of a block of samples of the digitized GNSS signal at least in part by determining the type of interference in the GNSS signal.

Example 9 includes the GNSS receiver of any of Examples 1-8, wherein the at least one processor is configured to implement at least one application processing module.

Example 10 includes a method of signal processing while accounting for interference in a signal, the method comprising: receiving a global navigation satellite system (GNSS) signal via a single GNSS antenna; digitizing the GNSS signal into a digitized GNSS signal having digitized samples using a radio frequency front end; calculating weight to be applied to a sample of a block of samples of the digitized GNSS signal; applying weight to at least one sample of the block of samples of the digitized GNSS signal to create a weighted GNSS signal; and performing signal processing on the weighted GNSS signal to create an output signal.

Example 11 includes the method of Example 10, wherein applying weight to digitized samples further comprises: storing the digitized samples of the at least one GNSS signal in a memory buffer; calculating weight for a respective digitized sample of the digitized samples; and multiplying the calculated weight with the respective digitized sample.

Example 12 includes the method of any of Examples 10-11, wherein processing the weighted digitized samples further comprises GNSS acquisition.

Example 13 includes the method of any of Examples 10-12, wherein processing the weighted digitized samples further comprises GNSS tracking.

Example 14 includes the method of any of Examples 10-13, wherein applying weight to digitized samples further comprises using a single weight algorithm for all tracked satellites.

Example 15 includes the method of any of Examples 10-14, further comprising receiving additional satellite input, wherein applying weight to digitized samples further comprises using the additional input for calculating the weight to be applied to a sample of the block of samples.

Example 16 includes the method of Example 15, wherein the weight algorithm for a first of a plurality of satellites is different than the weight algorithm for a second of the plurality of satellites.

Example 17 includes the method of any of Examples 10-16, wherein applying weight to digitized samples further comprises determining the type of interference in the received GNSS signal.

Example 18 includes the method of any of Examples 10-17, wherein at least one of calculating weight, applying weight, and performing signal processing is performed using at least one of a microprocessor, a microcontroller, an application-specific integrated circuit (ASIC), a field-programmable gate array (FPGA), a field-programmable object array (FPOA), or a programmable logic device (PLD).

Example 19 includes a processing unit of a global navigation satellite system (GNSS) receiver comprising: a radio frequency front end (RF-FE) configured to digitize a GNSS signal received from a single GNSS antenna; a weight determination unit to apply an appropriate weight to a block of samples of the GNSS signal received, wherein the weight determination unit further includes: a weight algorithm to calculate weight to be applied for a sample of the block of samples; a memory buffer to store the block of samples while the weight algorithm calculates weight to be applied; and a multiplier to multiply buffered samples output by the memory buffer with a corresponding weight calculated by the weight algorithm; and a baseband channel configured to receive and process a weighted GNSS signal output by the weight determination unit.

Example 20 includes the processing unit of any of Examples 18-19, wherein the processing unit includes at least one of a microprocessor, a microcontroller, an application-specific integrated circuit (ASIC), a field-programmable gate array (FPGA), a field-programmable object array (FPOA), or a programmable logic device (PLD).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A global navigation satellite system (GNSS) receiver comprising:
 at least one radio frequency (RF) front end configured to receive a GNSS signal from a single GNSS antenna and to digitize the GNSS signal into a digitized GNSS signal;
 at least one processor configured to:
  calculate weight to be applied to a sample of a block of samples of the digitized GNSS signal;
  apply the weight to at least one sample of the block of samples of the digitized GNSS signal based on at least one of:
   a respective variance of Gaussian measurement of the at least one sample of the block of samples,
   an average of the block of samples,
   power of a distance measurement equipment (DME) pulse based on amplitude of the respective sample of the block of samples, and
   power of a chirp signal based on amplitude of the at least one respective sample of the block of samples to create a weighted GNSS signal; and
  perform signal processing on the weighted GNSS signal.

2. The GNSS receiver of claim 1 wherein the at least one processor is further configured to:
 store the block of samples in at least one memory buffer included in the at least one processor while the weight to be applied is calculated;
 to multiply buffered samples output by the at least one memory buffer with a corresponding weight calculated by at least one multiplier included in the at least one processor; and
 wherein the signal processing is performed on the output from the at least one multiplier.

3. The GNSS receiver of claim 1, wherein the at least one processor is configured to implement a plurality of baseband channels configured to perform signal processing on the weighted GNSS signal, wherein each of the baseband channels receives at least a portion of the weighted GNSS signal to be processed.

4. The GNSS receiver of claim 1, wherein the at least one processor further implements:
 at least one weight determination unit by being configured to:
  receive a GNSS signal from the at least one RF front end;
  receive additional satellite input;
  calculate weight to be applied to a sample of a block of samples of the digitized GNSS signal based on the received additional satellite input; and
  apply the weight to at least one sample of the block of samples of the digitized GNSS signal to create a weighted GNSS signal; and
 at least one baseband channel by being configured to:
  perform signal processing on the weighted GNSS signal.

5. The GNSS receiver of claim 1, wherein the at least one processor includes at least one of a microprocessor, a microcontroller, an application-specific integrated circuit (ASIC), a field-programmable gate array (FPGA), a field-programmable object array (FPOA), or a programmable logic device (PLD).

6. The GNSS receiver of claim 1, wherein the at least one processor is configured to implement at least one baseband channel, wherein the at least one baseband channel includes at least one of a GNSS baseband tracking channel and a GNSS acquisition unit.

7. The GNSS receiver of claim 1, wherein the at least one processor is configured to implement at least one baseband channel, wherein the at least one baseband channel further comprises:
 at least one carrier generator;
 at least one carrier loop filter;
 at least one carrier discriminator;
 at least one code generator;
 at least one code loop filter; and
 at least one code discriminator.

8. The GNSS receiver of claim 1, wherein the at least one processor is configured to calculate the weight to be applied to a sample of a block of samples of the digitized GNSS signal at least in part by determining the type of interference in the GNSS signal.

9. The GNSS receiver of claim 1, wherein the at least one processor is configured to implement at least one application processing module.

10. A method of signal processing while accounting for interference in a signal, the method comprising:
 receiving a global navigation satellite system (GNSS) signal via a single GNSS antenna;
 digitizing the GNSS signal into a digitized GNSS signal having digitized samples using a radio frequency front end;
 calculating weight to be applied to a sample of a block of samples of the digitized GNSS signal;
 applying weight to at least one sample of the block of samples of the digitized GNSS signal to create a weighted GNSS signal, wherein the weight is applied based on at least one of:
  a respective variance of Gaussian measurement of the at least one sample of the block of samples,
  an average of the block of samples,
  power of a distance measurement equipment (DME) pulse based on amplitude of the respective sample of the block of samples, and
  power of a chirp signal based on amplitude of the at least one respective sample of the block of samples; and
 performing signal processing on the weighted GNSS signal to create an output signal.

11. The method of claim 10, wherein applying weight to digitized samples further comprises:
 storing the digitized samples of the at least one GNSS signal in a memory buffer;
 calculating weight for a respective digitized sample of the digitized samples; and
 multiplying the calculated weight with the respective digitized sample.

12. The method of claim 10, wherein processing the weighted digitized samples further comprises GNSS acquisition.

13. The method of claim 10, wherein processing the weighted digitized samples further comprises GNSS tracking.

14. The method of claim 10, wherein applying weight to digitized samples further comprises using a single weight algorithm for all tracked satellites.

15. The method of claim 10, further comprising receiving additional satellite input, wherein applying weight to digitized samples further comprises using the additional input for calculating the weight to be applied to a sample of the block of samples.

16. The method of claim 15, wherein the weight algorithm for a first of a plurality of satellites is different than the weight algorithm for a second of the plurality of satellites.

17. The method of claim 10, wherein applying weight to digitized samples further comprises determining the type of interference in the received GNSS signal.

18. The method of claim 10, wherein at least one of calculating weight, applying weight, and performing signal processing is performed using at least one of a microprocessor, a microcontroller, an application-specific integrated circuit (ASIC), a field-programmable gate array (FPGA), a field-programmable object array (FPOA), or a programmable logic device (PLD).

19. A processing unit of a global navigation satellite system (GNSS) receiver comprising:
   a radio frequency front end (RF-FE) configured to digitize a GNSS signal received from a single GNSS antenna;
   a weight determination unit to apply an appropriate weight to a block of samples of the GNSS signal received, wherein the weight determination unit further includes:
      a weight algorithm to calculate weight to be applied for a sample of the block of samples, wherein the weight algorithm applies weights based on at least one of:
         a respective variance of Gaussian measurement of the at least one sample of the block of samples,
         an average of the block of samples,
         power of a distance measurement equipment (DME) pulse based on amplitude of the respective sample of the block of samples, and
         power of a chirp signal based on amplitude of the at least one respective sample of the block of samples;
      a memory buffer to store the block of samples while the weight algorithm calculates weight to be applied; and
      a multiplier to multiply buffered samples output by the memory buffer with a corresponding weight calculated by the weight algorithm; and
   a baseband channel configured to receive and process a weighted GNSS signal output by the weight determination unit.

20. The processing unit of claim 18, wherein the processing unit includes at least one of a microprocessor, a microcontroller, an application-specific integrated circuit (ASIC), a field-programmable gate array (FPGA), a field-programmable object array (FPOA), or a programmable logic device (PLD).

* * * * *